United States Patent [19]
Atcher

[11] Patent Number: 6,036,388
[45] Date of Patent: Mar. 14, 2000

[54] WINDSHIELD WASHING SERVICE UNIT

[76] Inventor: Samuel L. Atcher, P.O. Box 64, Maywood, Ill. 60153

[21] Appl. No.: 09/248,709

[22] Filed: Feb. 11, 1999

[51] Int. Cl.[7] .............................. A47L 13/11; A47L 13/51
[52] U.S. Cl. ........................... 401/118; 221/96; 221/197; 15/121; 15/236.02; 15/245; 206/389; 220/529; 220/735; 220/740; D32/41; D32/45
[58] Field of Search ............................... 401/118; 221/96, 221/97, 197, 287; 15/121, 185, 236.02, 245; 206/15.3, 389, 514; 220/529, 736, 735, 740; D32/41, 42, 45, 53, 54

[56] References Cited

U.S. PATENT DOCUMENTS

| | | | |
|---|---|---|---|
| 2,924,494 | 2/1960 | Sloier | 206/389 |
| 3,562,841 | 2/1971 | Royalty | 15/121 |
| 4,143,792 | 3/1979 | Rex | 221/97 |
| 4,638,910 | 1/1987 | Bokmiller | 206/15.2 |
| 4,759,470 | 7/1988 | Jacobs | 221/97 |
| 5,548,865 | 8/1996 | Pagani | 15/262 |

*Primary Examiner*—Charles R. Eloshway

[57] ABSTRACT

A windshield washing service unit for providing a station for holding the equipment and supplies needed for cleaning windshields and other windows. The windshield washing service unit includes a housing with a spaced apart pair of side walls, spaced apart front and back walls extending between the side walls, and a bottom wall extending between the side walls and connecting the front and back walls together. The front, back, and bottom walls define a receptacle therebetween. An insert is inserted into the receptacle. The insert defines an open topped reservoir designed for holding a liquid therein. An elongate dowel is extended between and rotatably mounted to the side walls above the receptacle.

8 Claims, 2 Drawing Sheets

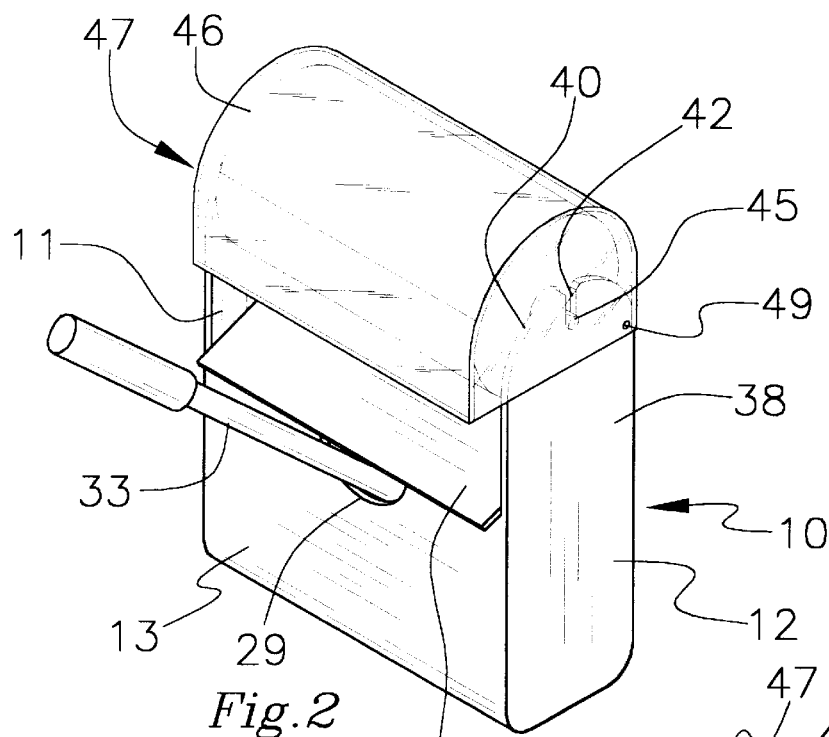
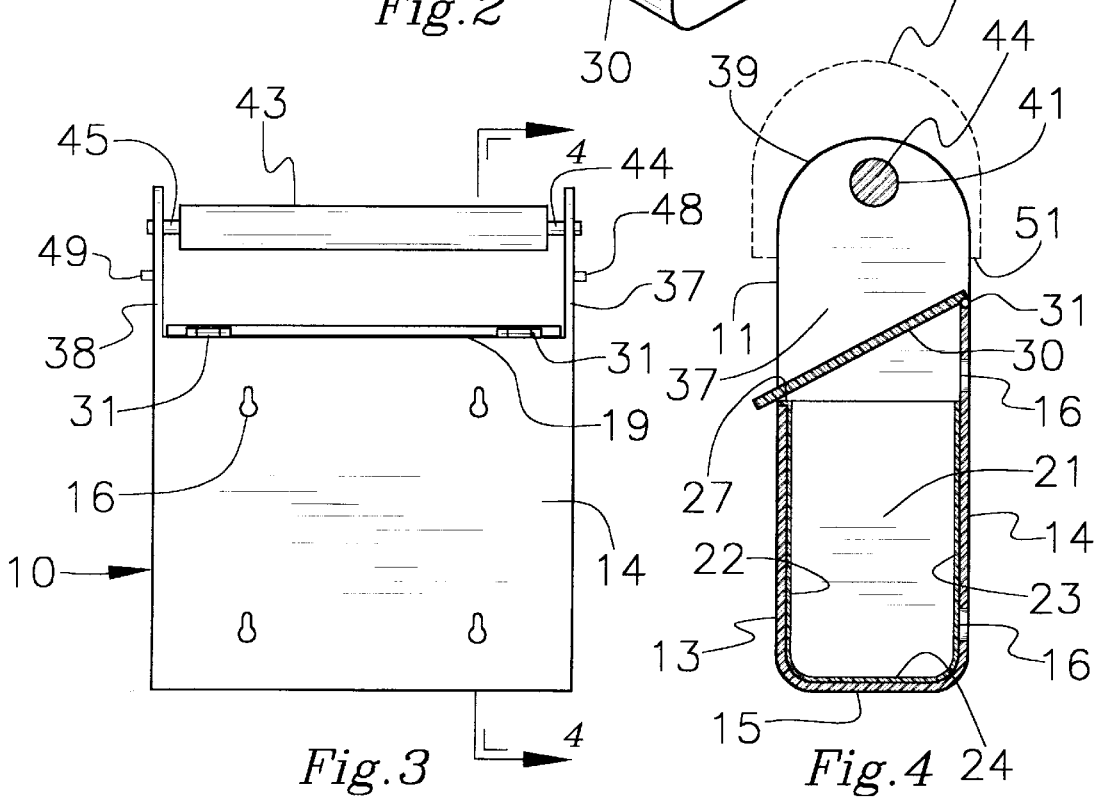

WINDSHIELD WASHING SERVICE UNIT

BACKGROUND OF THE INVENTION

1. Field of the Invention

The present invention relates to windshield washing service units and more particularly pertains to a new windshield washing service unit for providing a station for holding the equipment and supplies needed for cleaning windshields and other windows.

2. Description of the Prior Art

The use of windshield washing service units is known in the prior art. More specifically, windshield washing service units heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,143,792 by Rex; U.S. Pat. No. 5,257,423 by Jacobsen et al.; U.S. Pat. No. 4,759,470 by Jacobs; U.S. Pat. No. 4,915,257 by Bailey; U.S. Pat. No. 4,000,835 by Bassett et al.; and U.S. Pat. No. Des. 342,407 by Morand.

While these devices fulfill their respective, particular objectives and requirements, the aforementioned patents do not disclose a new windshield washing service unit. The inventive device includes a housing with a spaced apart pair of side walls, spaced apart front and back walls extending between the side walls, and a bottom wall extending between the side walls and connecting the front and back walls together. The front, back, and bottom walls define a receptacle therebetween. An insert is inserted into the receptacle. The insert defines an open topped reservoir designed for holding a liquid therein. An elongate dowel is extended between and rotatably mounted to the side walls above the receptacle.

In these respects, the windshield washing service unit according to the present invention substantially departs from the conventional concepts and designs of the prior art, and in so doing provides an apparatus primarily developed for the purpose of providing a station for holding the equipment and supplies needed for cleaning windshields and other windows.

SUMMARY OF THE INVENTION

In view of the foregoing disadvantages inherent in the known types of windshield washing service units now present in the prior art, the present invention provides a new windshield washing service unit construction wherein the same can be utilized for providing a station for holding the equipment and supplies needed for cleaning windshields and other windows.

The general purpose of the present invention, which will be described subsequently in greater detail, is to provide a new windshield washing service unit apparatus and method which has many of the advantages of the windshield washing service units mentioned heretofore and many novel features that result in a new windshield washing service unit which is not anticipated, rendered obvious, suggested, or even implied by any of the prior art windshield washing service units, either alone or in any combination thereof.

To attain this, the present invention generally comprises a housing with a spaced apart pair of side walls, spaced apart front and back walls extending between the side walls, and a bottom wall extending between the side walls and connecting the front and back walls together. The front, back, and bottom walls define a receptacle therebetween. An insert is inserted into the receptacle. The insert defines an open topped reservoir designed for holding a liquid therein. An elongate dowel is extended between and rotatably mounted to the side walls above the receptacle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new windshield washing service unit apparatus and method which has many of the advantages of the windshield washing service units mentioned heretofore and many novel features that result in a new windshield washing service unit which is not anticipated, rendered obvious, suggested, or even implied by any of the prior art windshield washing service units, either alone or in any combination thereof.

It is another object of the present invention to provide a new windshield washing service unit which may be easily and efficiently manufactured and marketed.

It is a further object of the present invention to provide a new windshield washing service unit which is of a durable and reliable construction.

An even further object of the present invention is to provide a new windshield washing service unit which is susceptible of a low cost of manufacture with regard to both materials and labor, and which accordingly is then susceptible of low prices of sale to the consuming public, thereby making such windshield washing service unit economically available to the buying public.

Still yet another object of the present invention is to provide a new windshield washing service unit which provides in the apparatuses and methods of the prior art some of the advantages thereof, while simultaneously overcoming some of the disadvantages normally associated therewith.

Still another object of the present invention is to provide a new windshield washing service unit for providing a station for holding the equipment and supplies needed for cleaning windshields and other windows.

Yet another object of the present invention is to provide a new windshield washing service unit which includes a housing with a spaced apart pair of side walls, spaced apart front and back walls extending between the side walls, and a bottom wall extending between the side walls and connecting the front and back walls together. The front, back, and bottom walls define a receptacle therebetween. An insert is inserted into the receptacle. The insert defines an open topped reservoir designed for holding a liquid therein. An elongate dowel is extended between and rotatably mounted to the side walls above the receptacle.

Still yet another object of the present invention is to provide a new windshield washing service unit that can be mounted to a variety of vertical surfaces including a user's garage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic perspective view of the present invention with the roll cover covering the upper portion of the roll of paper and the lid covering the reservoir and receptacle.

FIG. 3 is a schematic back side view of the present invention with the roll cover detached from the housing.

FIG. 4 is a schematic cross sectional view of the present invention taken from line 4—4 of FIG. 1 with the location of the roll cover illustrated in phantom lines.

DESCRIPTION OF THE PREFERRED EMBODIMENT

Figure 1:
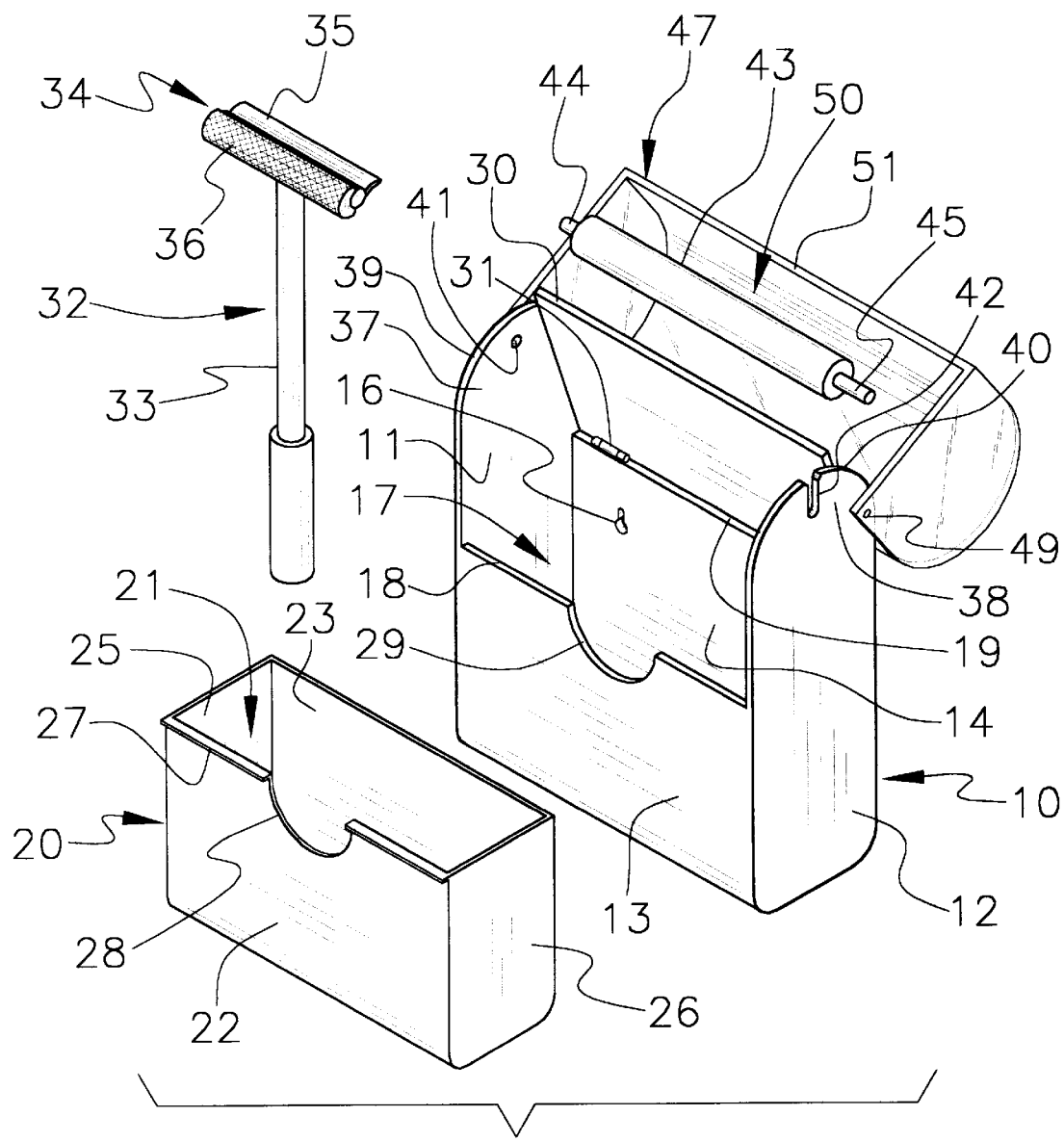
FIG. 1 is a schematic exploded view of a new windshield washing service unit according to the present invention.

With reference now to the drawings, and in particular to FIGS. 1 through 4 thereof, a new windshield washing service unit embodying the principles and concepts of the present invention will be described.

As best illustrated in FIGS. 1 through 4, the windshield washing service unit generally comprises a housing with a spaced apart pair of side walls, spaced apart front and back walls extending between the side walls, and a bottom wall extending between the side walls and connecting the front and back walls together. The front, back, and bottom walls define a receptacle therebetween. An insert is inserted into the receptacle. The insert defines an open topped reservoir designed for holding a liquid therein. An elongate dowel is extended between and rotatably mounted to the side walls above the receptacle.

In closer detail, the windshield washing service unit comprises a housing 10 with a spaced apart pair of side walls 11,12, spaced apart front and back walls 13,14 extending between the side walls of the housing, and a bottom wall 15 extending between the side walls of the housing and connecting the front and back walls of the housing together. Preferably, the side walls of the housing lie in substantially parallel planes with one another. In this preferred embodiment, the front and back walls of the housing preferably lie in substantially parallel planes with one another substantially perpendicular to the planes of the side walls of the housing. Additionally, in this preferred embodiment, the bottom wall preferably lies in a plane substantially perpendicular to the planes of the front, back, and side walls of the housing.

In use, the back wall of the housing is designed for mounting to a vertical support surface. As best illustrated in FIGS. 3 and 4, the back wall of the housing has a plurality of generally keyhole-shaped mounting apertures 16 therein. Each of the mounting apertures is designed for receiving therein a fastener outwardly extending from the vertical support surface to mount the back wall of the housing on the vertical support surface.

The front, back, and bottom walls of the housing define a receptacle 17 therebetween. The front and back walls of the housing each have a substantially straight upper edge 18,19 extending between the side walls of the housing. The upper edges of the front and back walls define an upper opening into the receptacle. Preferably, the upper edges of the front and back walls are extended substantially parallel to one another. In this preferred embodiment, the upper edges of the front and back walls lie in unique horizontal planes extending substantially parallel to one another and to the plane of the bottom wall of the housing. The plane of upper edge 18 of the front wall is positioned between the plane of the upper edge of the back wall and the plane of the bottom wall such that the upper edge 19 of the back wall is positioned above the upper edge of the front wall with respect to the bottom wall. The upper edges of the front and back walls define a plane extending at an acute angle to the plane of the bottom wall. Ideally, the acute angle is about 30 degrees.

An generally rectangular box-shaped and relatively rigid (i.e., non-flexible) insert 20 or bucket is removably inserted into the receptacle. The insert defines an open topped reservoir 21 designed for holding a liquid therein. The insert has a front 22, a back 23, a bottom 24, and a pair of sides 25,26. The front, back, and sides of the insert each have an upper edge which preferably lie in a common plane extending substantially parallel to the bottom of the insert. When inserted into the receptacle, the front of the insert is positioned adjacent the front wall of the housing, the back of the insert is positioned adjacent the back wall of the housing, the bottom of the insert is positioned adjacent the bottom wall of the housing, and each of the sides of the insert is positioned a corresponding associated side wall of the housing. The common plane the upper edges of the insert is preferably extended substantially parallel to the planes of the upper edges of the front and back walls of the housing when the insert is properly inserted into the receptacle.

Preferably, the front of the insert has a lip 27 outwardly extending therefrom along the upper edge of the front of the insert. As best illustrated in FIG. 4, the lip of the front of the insert is rested on the upper edge of the front wall of the housing when the insert is in the receptacle.

The front of the insert and the front wall of the housing each preferably have generally equal sized and commonly aligned arcuate cutouts 28,29 adjacent the upper edge of the front of the insert and the upper edge of the front wall of the housing respectively. The cutouts of the insert and the housing each are ideally equidistantly spaced between the side walls of the housing.

A generally rectangular lid 30 substantially covers the reservoir and receptacle. The lid is pivotally coupled by hinges 31 to the back wall of the housing adjacent the upper edge of the back wall. The lid is rested on the lip of the insert when the insert is disposed in the receptacle. The lid lies in a plane when resting on the lip extending at an acute angle to the bottom wall of the housing. Ideally, the acute angle of the lid is about 30 degrees.

A squeegee 32 is also includes having an elongate handle 33 and a head 34 coupled to an end of the handle. The head of the squeegee has a squeegee blade 35 and a sponge 36. As illustrated in FIG. 2, the head of the squeegee is inserted into the reservoir of the insert such that the handle of the squeegee upwardly extends out of the reservoir of the insert through the cutouts of the insert and housing.

The side walls of the housing each have an upper portion 37,38 upwardly extending from the plane of the upper edge of the back wall of the housing. The upper portions of the side walls of the housing each terminate at a generally semi-circular arcuate top edge 39,40 each having a concavity facing in a direction towards the bottom wall of the housing. As best illustrated in FIG. 1, a first of the side walls of the housing has a generally circular hole 41 therethrough adjacent the top edge of the first side wall. A second of the side walls of the housing has a generally U-shaped slot 42 therethrough downwardly extending from the top edge of the second side wall. The hole of the first side wall and the slot of the second side wall is aligned with one another along an axis extending substantially parallel to the upper edges of the front and back walls of the housing and the plane of the bottom wall of the housing.

A generally cylindrical elongate dowel 43 is extended between the upper portions of the side walls of the housing. The dowel has a pair of opposite ends and a longitudinal axis extending between the ends of the dowel As shown in FIG. 1, the ends of the dowel each have an extent 44,45 outwardly extending therefrom. The extent of one of the ends of the dowel is inserted into the hole of the first side wall and the extent of the other ends of the dowel is inserted into the slot of the second side wall to rotatably mount the dowel to the upper portions of the side walls to permit free rotation of the dowel about the longitudinal axis of the dowel.

A generally cylindrical roll of paper 46 is disposed around the dowel and positioned between the side walls of the housing. In use, the roll of paper is designed for providing a user with paper to clean windows and the squeegee.

In a preferred embodiment a generally semi-cylindrical roll cover 47 is pivotally and detachably mounted to upper portions of the side walls of the housing at substantially coaxial pivot points comprising a pair of studs 48,49 outwardly extending from the side walls of the housing located towards the back wall of the housing. The roll cover defines open bottom cavity 50 in which an upper portion of the roll of paper is received when the roll cover covering an upper portion of the roll of paper to protect the roll from falling precipitation. Optionally, as illustrated in the Figures, the roll cover comprises a translucent material to permit viewing of the roll of paper therebeneath. The roll cover has a bottom edge 51 defining the open bottom of the cavity of the roll cover. As best illustrated in FIG. 4, the bottom edge of the roll cover ideally lies in a plane extending generally parallel to the bottom wall of the housing when the roll cover is covering the roll of paper The housing has a height defined between the bottom wall and the top edges of the side walls, a width defined between the side walls, and a depth defined between the front and back walls. In an ideally illustrative embodiment, the height of the housing is about 12 inches, the width of the housing is about 12 inches, and the depth of the housing is about 5 inches. In this ideal illustrative embodiment, preferably, the distance between the top edges of the side walls of the housing and the upper edge of the front wall is about 4½ inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. In combination:

a housing having a spaced apart pair of side walls, spaced apart front and back walls extending between said side walls of said housing, and a bottom wall extending between said side walls of said housing and connecting said front and back walls of said housing together;

said front, back, and bottom walls of said housing defining a receptacle therebetween;

an insert being inserted into said receptacle, said insert defining an open topped reservoir adapted for holding a liquid therein;

an elongate dowel being extended between side walls of said housing above said receptacle, said dowel being rotatable mounted to said side walls of said housing for rotatably supporting a roll of towels thereon; and a lid substantially covering said reservoir and receptacle, said lid being pivotally coupled to said back wall of said housing.

2. The combination of claim 1, wherein said insert has a lip outwardly extending therefrom, said lip of said insert being rested on said front wall of said housing.

3. The combination of claim 1, wherein said insert and said front wall of said housing each have aligned cutouts.

4. The combination of claim 1, wherein said cutouts of said insert and said housing each are generally equidistantly spaced between said side walls of said housing.

5. The combination of claim 1, wherein a first of said side walls of said housing has a hole therethrough, wherein a second of said side walls of said housing has a slot therethrough, wherein said hole of said first side wall and said slot of said second side wall are aligned with one another, wherein said dowel has a pair of opposite ends, wherein said ends of said dowel each have an extent outwardly extending therefrom, wherein said extent of one of said ends of said dowel is inserted into said hole of said first side wall and said extent of the other ends of said dowel is inserted into said slot of said second side wall to rotatably mount said dowel to said side walls.

6. The combination of claim 1, further comprising a roll of paper being disposed around said dowel and positioned between said side walls of said housing.

7. The combination of claim 6, further comprising a roll cover being pivotally mounted to upper portions of said side walls of said housing at pivot points located towards said back wall of said housing, said roll cover covering an upper portion of said roll of paper.

8. In combination:

a housing having a spaced apart pair of side walls, spaced apart front and back walls extending between said side walls of said housing, and a bottom wall extending between said side walls of said housing and connecting said front and back walls of said housing together;

said side walls of said housing lying in substantially parallel planes with one another, said front and back walls of said housing lying in substantially parallel planes with one another substantially perpendicular to said planes of said side walls of said housing, said bottom wall lying in a plane substantially perpendicular to said planes of said front, back, and side walls of said housing;

said back wall of said housing being adapted for mounting to a vertical support surface, said back wall of said housing having a plurality of generally keyhole-shaped mounting apertures therein, each of said mounting apertures being adapted for receiving therein a fastener outwardly extending from the vertical support surface to mount said back wall of said housing on the vertical support surface;

said front, back, and bottom walls of said housing defining a receptacle therebetween;

said front and back walls of said housing each having a substantially straight upper edge extending between said side walls of said housing;

said upper edges of said front and back walls defining an upper opening into said receptacle;

said upper edges of said front and back walls being extended substantially parallel to one another, said upper edges of said front and back walls lying in unique planes extending substantially parallel to one another and to said plane of said bottom wall of said housing;

said plane of said upper edge of said front wall being positioned between said plane of said upper edge of said back wall and said plane of said bottom wall such that said upper edge of said back wall is positioned above said upper edge of said front wall with respect to said bottom wall;

said upper edges of said front and back walls defining a plane extending at an acute angle to said plane of said bottom wall;

an insert being inserted into said receptacle, said insert defining an open topped reservoir adapted for holding a liquid therein;

said insert having a front, a back, a bottom, and a pair of sides, said front, back, and sides of said insert each having an upper edge, said upper edges of said front, back, and sides of said insert lying in a common plane extending substantially parallel to said bottom of said insert;

said front of said insert being positioned adjacent said front wall of said housing, said back of said insert being positioned adjacent said back wall of said housing, said bottom of said insert being positioned adjacent said bottom wall of said housing each of said sides of said insert being positioned adjacent a corresponding associated side wall of said housing, the common plane of said upper edges of said insert being extended substantially parallel to said planes of said upper edges of said front and back walls of said housing;

said front of said insert having a lip outwardly extending therefrom along said upper edge of said front of said insert, said lip of said front of said insert being rested on said upper edge of said front wall of said housing;

said front of said insert and said front wall of said housing each having generally equal sized and commonly aligned arcuate cutouts adjacent said upper edge of said front of said insert and said upper edge of said front wall of said housing respectively;

said cutouts of said insert and said housing each being equidistantly spaced between said side walls of said housing;

a generally rectangular lid substantially covering said reservoir and receptacle, said lid being pivotally coupled to said back wall of said housing adjacent said upper edge of said back wall;

said lid being rested on said lip of said insert, said lid lying in a plane extending at an acute angle to said bottom wall of said housing when closed;

a squeegee having an elongate handle and a head coupled to an end of said handle, said head of said squeegee having a squeegee blade and a sponge, said head of said squeegee being inserted into said reservoir of said insert such that said handle of said squeegee upwardly extends out of said reservoir of said insert through said cutouts of said insert and housing;

said side walls of said housing each having an upper portion upwardly extending from said plane of said upper edge of said back wall of said housing;

said upper portions of said side walls of said housing each terminating at a generally semi-circular arcuate top edge each having a concavity facing in a direction towards said bottom wall of said housing;

a first of said side walls of said housing having a generally circular hole therethrough adjacent said top edge of said first side wall;

a second of said side walls of said housing having a generally U-shaped slot therethrough downwardly extending from said top edge of said second side wall, said hole of said first side wall and said slot of said second side wall being aligned with one another along an axis extending substantially parallel to said upper edges of said front and back walls of said housing and said plane of said bottom wall of said housing;

a generally cylindrical elongate dowel being extended between said upper portions of said side walls of said housing, said dowel having a pair of opposite ends and a longitudinal axis extending between said ends of said dowel said ends of said dowel each having an extent outwardly extending therefrom, said extent of one of said ends of said dowel being inserted into said hole of said first side wall and said extent of the other end of said dowel being inserted into said slot of said second side wall to rotatably mount said dowel to said upper portions of said side walls to permit free rotation of said dowel about said longitudinal axis of said dowel;

a generally cylindrical roll of paper being disposed around said dowel and positioned between said side walls of said housing;

a generally semi-cylindrical roll cover being pivotally mounted to the upper portions of said side walls of said housing at substantially coaxial pivot points located towards said back wall of said housing; and said roll cover covering an upper portion of said roll of paper.

* * * * *